(12) United States Patent
Harvey

(10) Patent No.: US 9,477,381 B2
(45) Date of Patent: Oct. 25, 2016

(54) USER INTERFACE FOR TOOLBAR NAVIGATION

(71) Applicant: Intergraph Corporation, Madison, AL (US)

(72) Inventor: Keith D. Harvey, Huntsville, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 185 days.

(21) Appl. No.: 14/155,457

(22) Filed: Jan. 15, 2014

(65) Prior Publication Data

US 2014/0282151 A1 Sep. 18, 2014

Related U.S. Application Data

(60) Provisional application No. 61/777,039, filed on Mar. 12, 2013.

(51) Int. Cl.
*G06F 15/00* (2006.01)
*G06F 13/00* (2006.01)
(Continued)

(52) U.S. Cl.
CPC ........... *G06F 3/0482* (2013.01); *G06F 3/0481* (2013.01); *G06F 3/0488* (2013.01)

(58) Field of Classification Search
CPC ............................ G06F 3/0483; G06F 3/0488
USPC ....... 715/765, 738, 777, 779, 733, 760, 711, 715/786
See application file for complete search history.

(56) References Cited

U.S. PATENT DOCUMENTS

| 5,748,185 A | 5/1998 | Stephan et al. ................ 345/173 |
| 5,943,052 A | 8/1999 | Allen et al. .................... 345/341 |

(Continued)

FOREIGN PATENT DOCUMENTS

| EP | 0 919 907 A1 | 6/1999 | ............. G06F 3/033 |
| KR | 10-2009-0111764 | 10/2009 | |

(Continued)

OTHER PUBLICATIONS

International Searching Authority, International Search Report—International Application No. PCT/US2014/011805, dated May 13, 2014, together with the Written Opinion of the International Searching Authority, 10 pages.

(Continued)

*Primary Examiner* — Kevin Nguyen
(74) *Attorney, Agent, or Firm* — Sunstein Kann Murphy & Timbers LLP

(57) ABSTRACT

A system and method for navigating a collection of toolbar items that are displayed on an electronic display screen. The toolbar items, such as buttons, are organized into an ordered set of toolbar pages. Each toolbar page contains a fixed number of toolbar items. One toolbar page from the set is displayed at a time in a fixed display area, e.g., a tile, on the display screen. User input causes the currently displayed toolbar page to be replaced by another toolbar page in the ordered set. The user input, such as a continuous swipe gesture across the toolbar display tile, determines the direction of navigation through pages in the ordered set and the speed of the page navigation. The toolbar display area can show the position of the currently displayed toolbar in the ordered set and animated transitions between toolbar items may be displayed to signal toolbar page replacements. A user input, such as a tap of a finger, can select the replacement toolbar.

22 Claims, 13 Drawing Sheets

(51) Int. Cl.
*G06F 3/0482* (2013.01)
*G06F 3/0488* (2013.01)
*G06F 3/0481* (2013.01)

(56) References Cited

U.S. PATENT DOCUMENTS

| | | | |
|---|---|---|---|
| 6,154,194 A | 11/2000 | Singh | 345/131 |
| 6,211,856 B1 | 4/2001 | Choi et al. | 345/130 |
| 6,757,002 B1 | 6/2004 | Oross et al. | 345/864 |
| 6,828,992 B1 | 12/2004 | Freeman et al. | 345/810 |
| 6,907,365 B2 | 6/2005 | Salant et al. | 702/68 |
| 7,138,980 B2 | 11/2006 | Kao et al. | 345/160 |
| 7,565,625 B2 | 7/2009 | Mullins, II et al. | 715/835 |
| 7,627,826 B2 | 12/2009 | Pry | 715/745 |
| 7,681,142 B2 | 3/2010 | Jarrett et al. | 715/784 |
| 7,730,401 B2 | 6/2010 | Gillespie et al. | 715/702 |
| 7,958,455 B2 | 6/2011 | Doar | 715/784 |
| 8,091,041 B2 | 1/2012 | Karstens | 715/810 |
| 8,091,042 B2 | 1/2012 | Chen et al. | 715/826 |
| 8,194,099 B2 | 6/2012 | Ubillos et al. | 345/619 |
| 8,225,225 B2 | 7/2012 | Jetha et al. | 715/769 |
| 8,261,205 B2 | 9/2012 | Lee | 715/784 |
| 8,276,095 B2 | 9/2012 | Cutler et al. | 715/804 |
| 8,314,789 B2 | 11/2012 | Fitzmaurice et al. | 345/419 |
| 8,601,389 B2 * | 12/2013 | Schulz | G06F 3/0482 345/156 |
| 2006/0136834 A1 | 6/2006 | Cao et al. | 715/779 |
| 2007/0013708 A1 | 1/2007 | Barcklay et al. | 345/557 |
| 2009/0150810 A1 | 6/2009 | Burroughs et al. | 715/764 |
| 2009/0265657 A1 | 10/2009 | Bamford et al. | |
| 2010/0281374 A1 | 11/2010 | Schulz et al. | 715/723 |
| 2010/0281430 A1 | 11/2010 | Safar | |
| 2010/0299614 A1 | 11/2010 | Hangas et al. | 715/752 |
| 2011/0041092 A1 | 2/2011 | Zhang | 715/777 |
| 2011/0145737 A1 | 6/2011 | Laugwitz et al. | 715/763 |
| 2012/0304111 A1 | 11/2012 | Queru | 715/784 |
| 2012/0311498 A1 | 12/2012 | Kluttz et al. | 715/825 |
| 2015/0177933 A1 * | 6/2015 | Cueto | G06F 3/0483 715/776 |

FOREIGN PATENT DOCUMENTS

| | | | | |
|---|---|---|---|---|
| KR | 10-2012-0023722 | 3/2012 | | |
| WO | WO 01/46790 A2 | 6/2001 | | G06F 3/00 |
| WO | WO 2005/111854 A2 | 11/2005 | | G06F 17/00 |
| WO | WO 2008/021670 A2 | 2/2008 | | G06F 3/048 |
| WO | WO 2010/126782 A1 | 11/2010 | | |
| WO | WO 2011/100112 A1 | 8/2011 | | G09G 5/00 |

OTHER PUBLICATIONS

Korean Patent Office, Office Action pertaining to Appl. No. 1-02015-7025051, 6 pages, dated Mar. 29, 2016.
Darae Law & IP Firm, English translation of Office Action pertaining to Appl. No. 1-02015-7025051, 9 pages, dated Mar. 29, 2016.
Simin Baharlou, International Preliminary Report on Patentability, International application No. PCT/2014/01185.
European Patent Office, Communication pursuant to Rules 161(1) and 162 EPC, Application No. 14704423.4, Oct. 20, 2015, 2 pages.
Christoph Gyaja, Response to Communication pursuant to Rules 161(1) and 162 EPC, Application No. 14704423.4, Apr. 12, 2016, 12 pages.

* cited by examiner

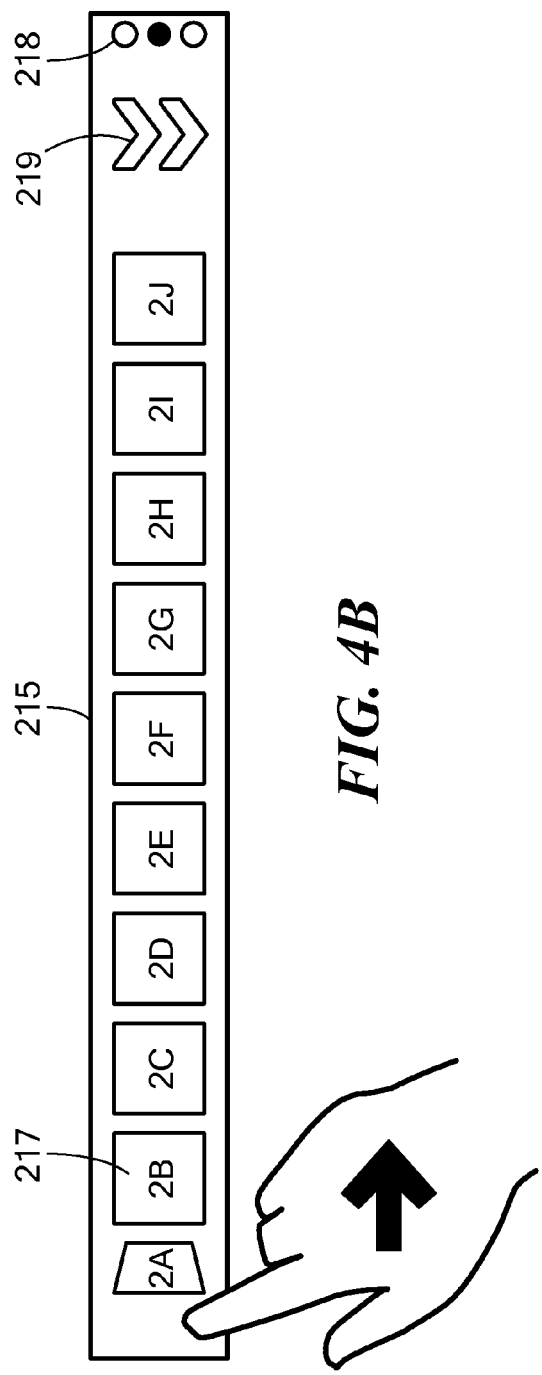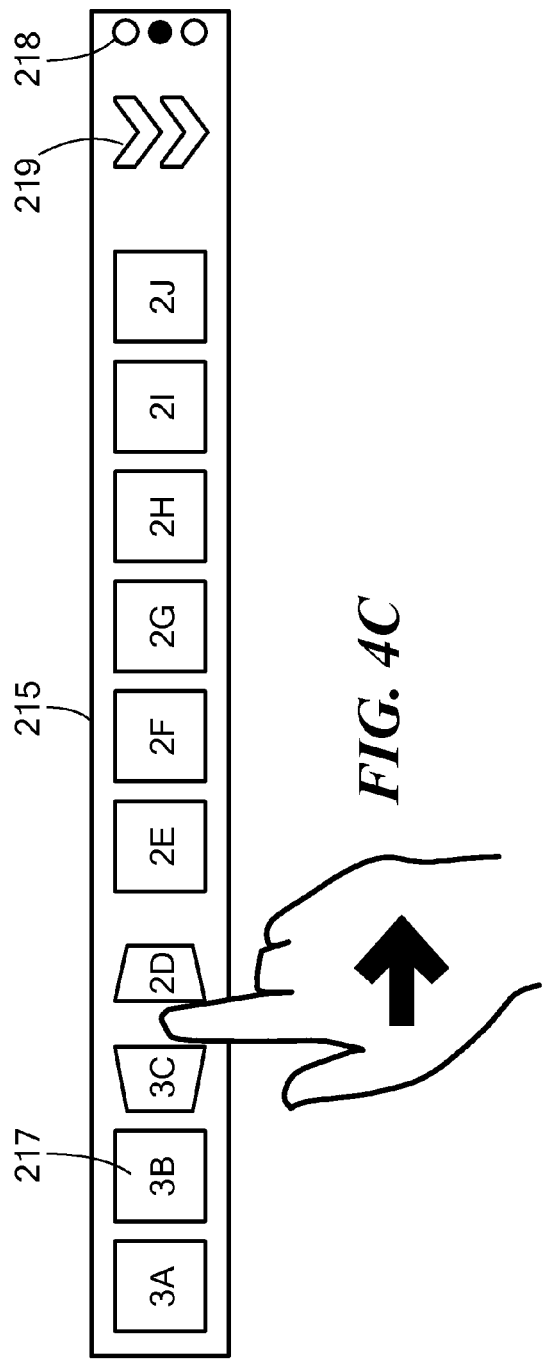

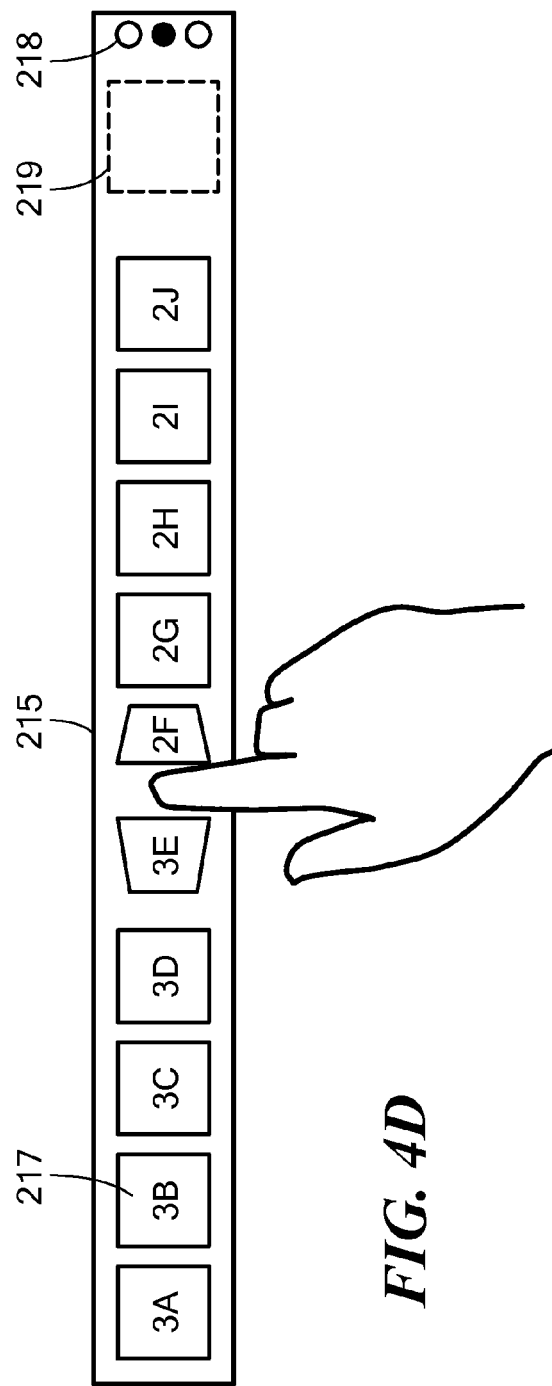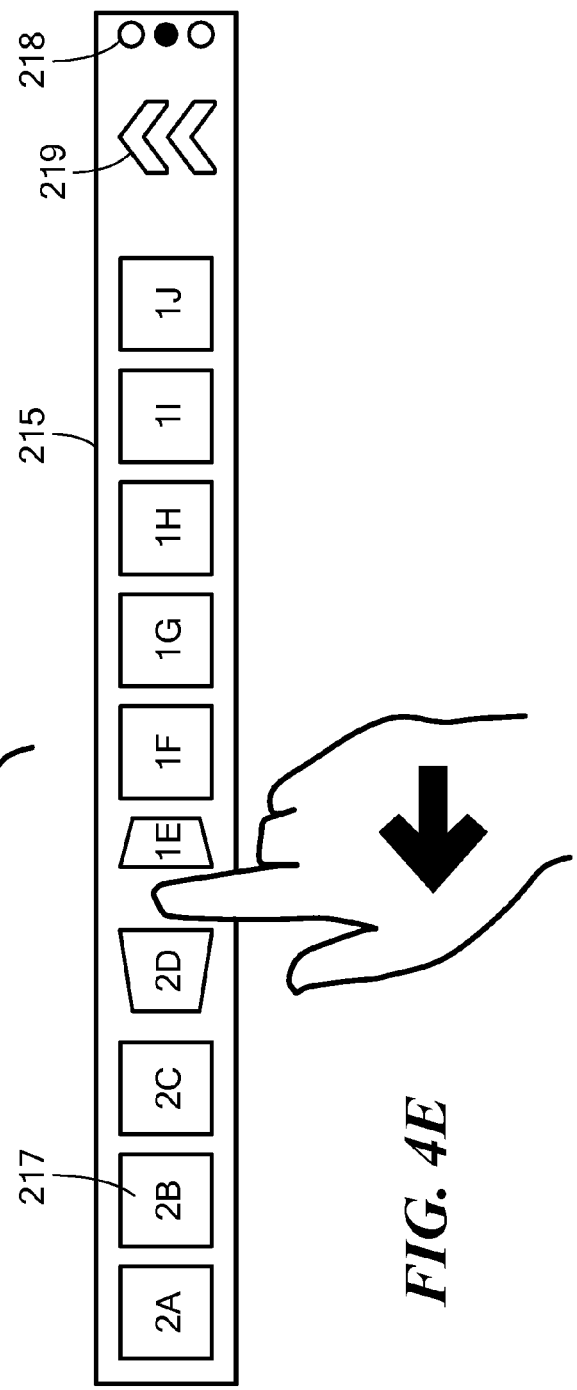

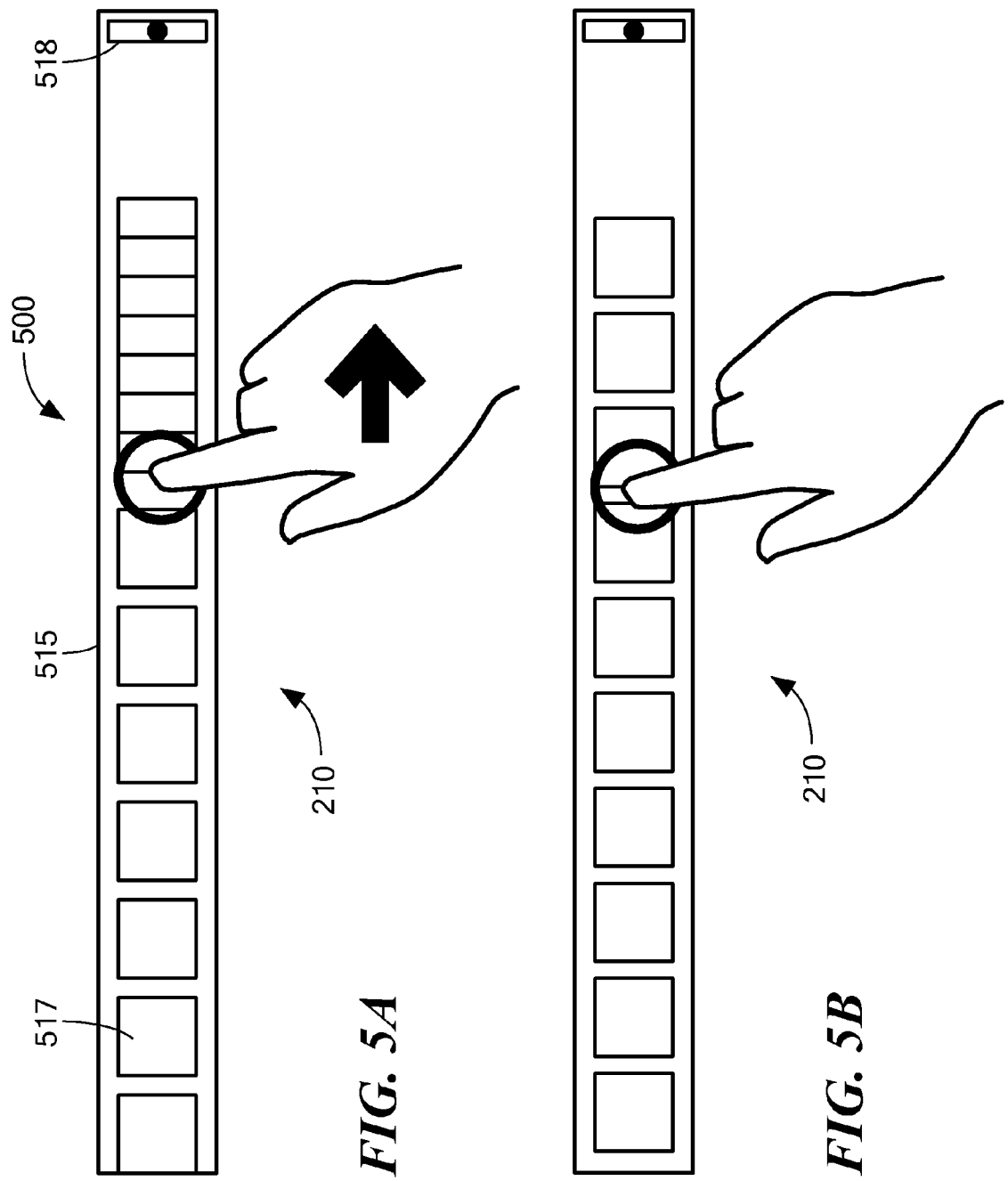

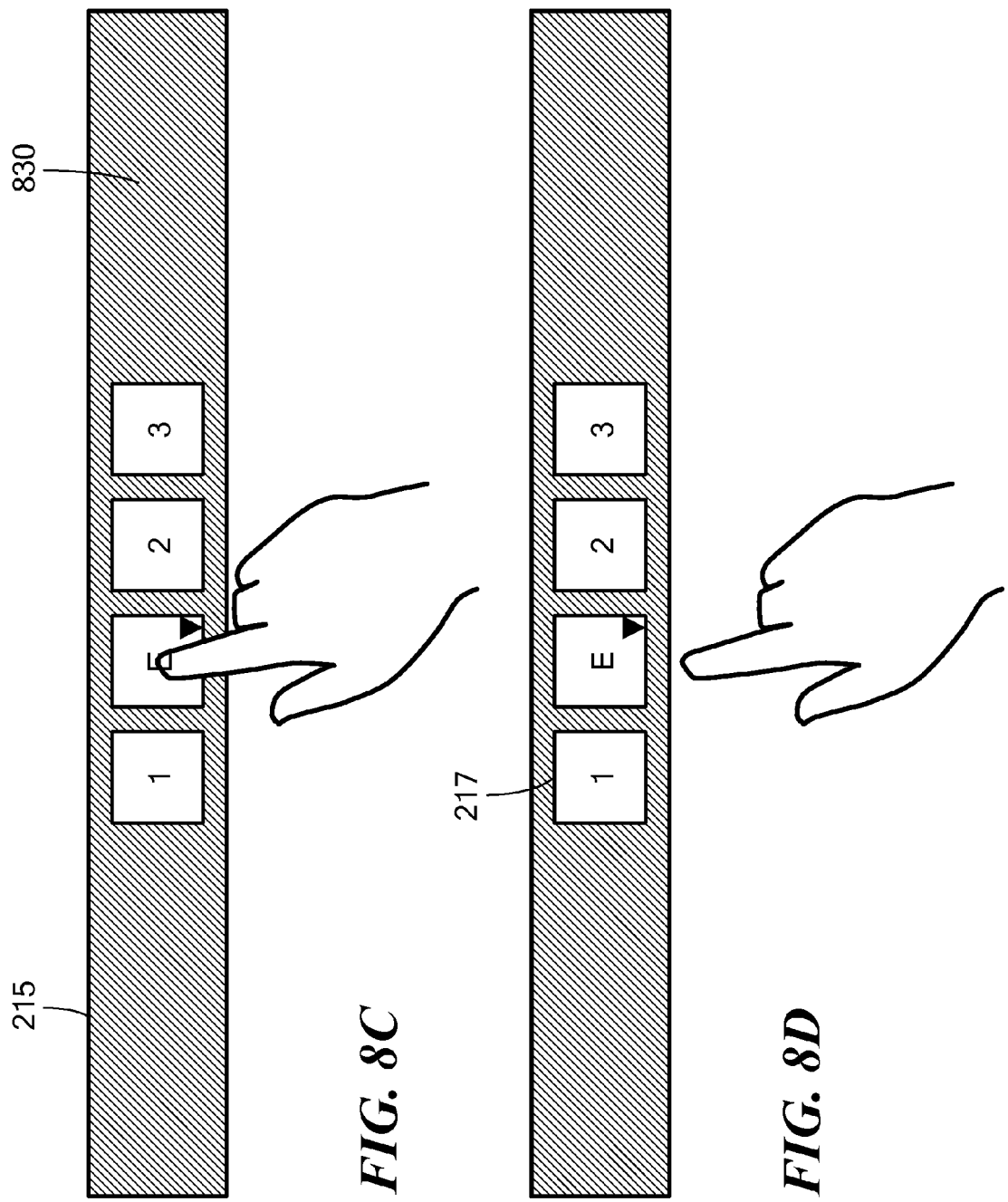

USER INTERFACE FOR TOOLBAR NAVIGATION

This patent application claims priority to U.S. Provisional Patent Application No. 61/777,039, filed Mar. 12, 2013, the disclosure of which application is incorporated by reference herein in its entirety.

TECHNICAL FIELD

The present invention relates to user interface techniques for computer processing systems and, in particular, techniques for navigating between sets of toolbar buttons on a display screen.

BACKGROUND ART

Display screens of electronic processing systems often include one or more toolbars that allow a user to initiate actions by activating toolbar buttons. Toolbar button activation can be via a pointing device, such as a mouse and a mouse click. Alternatively, touch screens allow button activation with the touch of a user's finger to the button.

The number of toolbar buttons that can be displayed simultaneously to a user is limited by the display screen space allocated to the toolbar and the size of a button. Screen "real estate" is particularly limited on some devices, such as smartphones. Devices with touch screens, in particular, must maintain a minimum button size which is dictated by a user's fingertip size. Effective ways are needed to present more toolbar buttons to a user than can be displayed at one time in the screen space allocated to toolbars.

SUMMARY OF THE EMBODIMENTS

In preferred embodiments of the invention, a method is provided for navigating a collection of toolbar items that are displayed on an electronic display screen. The toolbar items, such as buttons, are organized into an ordered set of toolbar pages. Each toolbar page contains a fixed number of toolbar items. One toolbar page from the set is displayed at a time in a fixed display area, e.g., a tile, on the screen. User input causes the currently displayed toolbar page to be replaced by another toolbar page in the ordered set. The user input, such as a continuous swipe gesture across the toolbar display tile, determines the direction of navigation through toolbar pages in the ordered set and the speed of the toolbar page navigation. A user input, such as a tap of the finger, can select the desired replacement toolbar page when it is displayed.

In other embodiments of the invention, the position of the currently displayed toolbar page within the ordered set of toolbar pages is shown on the toolbar tile. The direction of navigation of toolbar pages within the ordered set of pages may also be displayed on the toolbar tile.

In various embodiments, user gestures, such as swiping a finger across the toolbar display tile or moving a mouse pointer across the toolbar display tile, cause navigation through the ordered set of toolbar pages. Toolbar items can change with animated transitions during toolbar page navigation to show toolbar page replacement.

In another preferred embodiment of the invention, a virtual touchpad is provided as part of the toolbar display tile. Toolbar page navigation is accomplished in a continuous gesture on the virtual touch pad by moving the user's finger. The system recognizes small movements of the user's finger from side-to-side or up-and-down on the virtual touch pad. These finger movements cause the toolbar tile to preview each successive toolbar page, cycling forward or backward through the ordered set of toolbar pages depending on the direction of the user's finger movement. The user can then select a previewed page to replace the currently displayed toolbar page.

In embodiments of the invention, the system determines the number of toolbar items presented on each toolbar page in the ordered set of toolbar pages based on the size of the display area devoted to the toolbar tile in the particular implementation. In other embodiments of the invention, the system orders the toolbar items within a toolbar page so that toolbar items are presented in the order of frequency of use.

In another preferred embodiment of the invention, access to hierarchical submenus is provided via a user gesture. A toolbar page is displayed with a hierarchical toolbar item that includes a hierarchical visual indicator. To access additional items in the hierarchy, the user activates the hierarchical toolbar item. The system then replaces the existing toolbar page in the toolbar tile with a submenu toolbar page. The user can then activate the desired item in the submenu toolbar page. After the submenu item selection occurs, the original toolbar page reappears in the toolbar tile with the selected item from the submenu replacing the hierarchical toolbar item.

BRIEF DESCRIPTION OF THE DRAWINGS

The features of embodiments will be more readily understood by reference to the following detailed description, taken with reference to the accompanying drawings, in which:

FIGS. 4B-4E illustrate animated transitions of toolbar items to show toolbar page replacement, employed in an embodiment of the invention;

FIGS. 5A and 5B show another animation of toolbar items to show toolbar page replacement employed in an embodiment of the invention;

FIGS. 8A-8F and 9 illustrate user input gestures that can access submenu items in a hierarchical toolbar menu, in another embodiment of the invention.

DETAILED DESCRIPTION OF SPECIFIC EMBODIMENTS

In various embodiments of the invention, a method is provided for navigating a collection of toolbar items that are displayed on an electronic display screen. The toolbar items, such as buttons, are organized into an ordered set of toolbar pages. Each toolbar page contains a fixed number of toolbar items. One toolbar page from the set is displayed at a time in a fixed display area, e.g., a tile, on the screen. User input causes the currently displayed toolbar page to be replaced by another toolbar page in the ordered set. The user input, such as a continuous swipe gesture across the toolbar display tile, determines the direction of navigation through pages in the ordered set and the speed of the page navigation. The toolbar display area shows the position of the currently displayed toolbar in the ordered set and animated transitions between toolbar items may be displayed to signal toolbar page replacements. A user input, such as a tap of the finger, can select the replacement toolbar page when it is displayed. This method of toolbar navigation allows a large number of toolbar items to be available to the user while avoiding the use of drop-down panels that can obscure other areas of the display screen. Further, this approach can avoid some of the difficulties of scrolling toolbars, in that it may be more difficult to appreciate visually the items scrolled into and out of the toolbar display area, than with toolbar items presented as a toolbar page.

Figure 1:
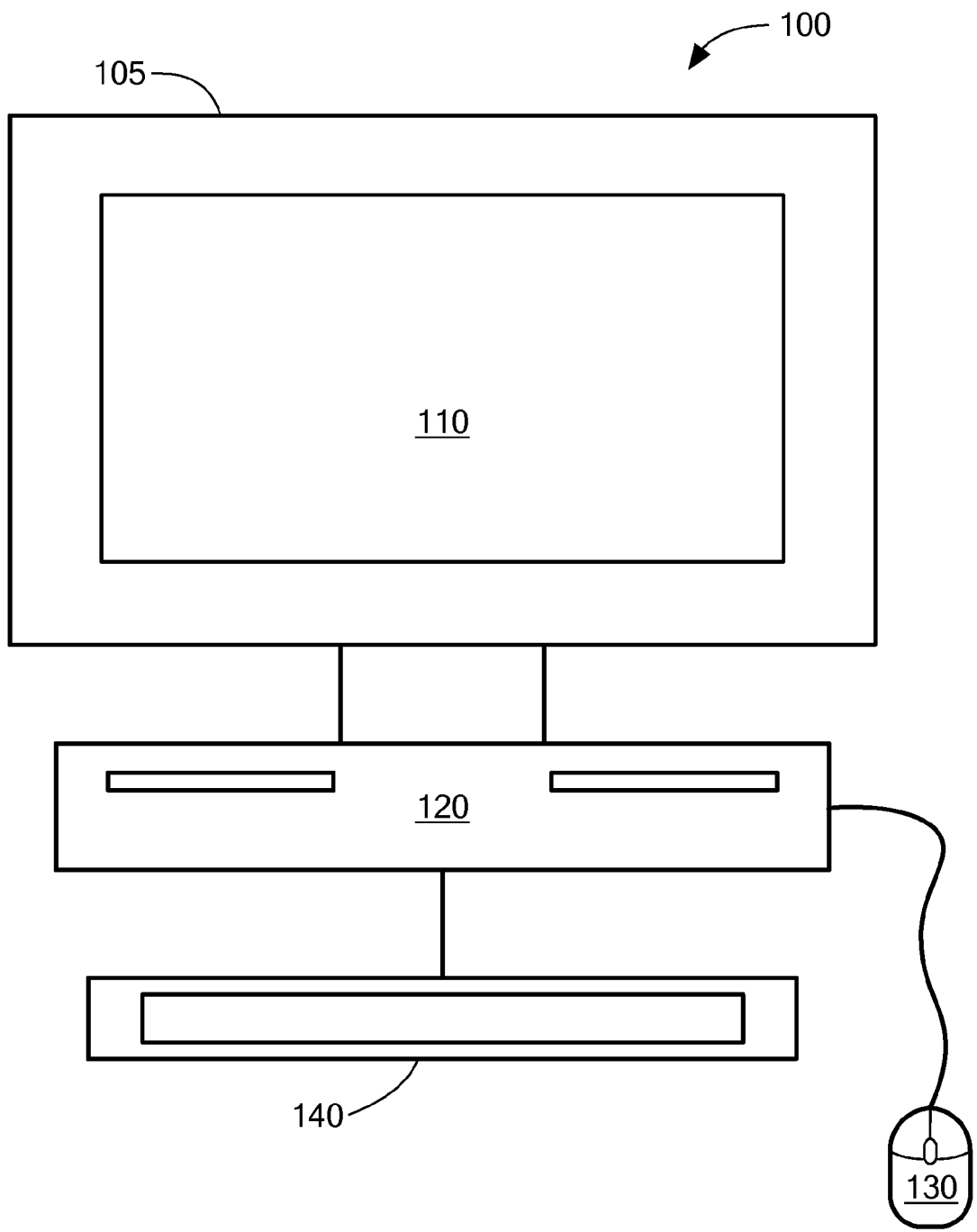
FIG. 1 shows a desktop computer system for use in an embodiment of the present invention.
Figure 2:
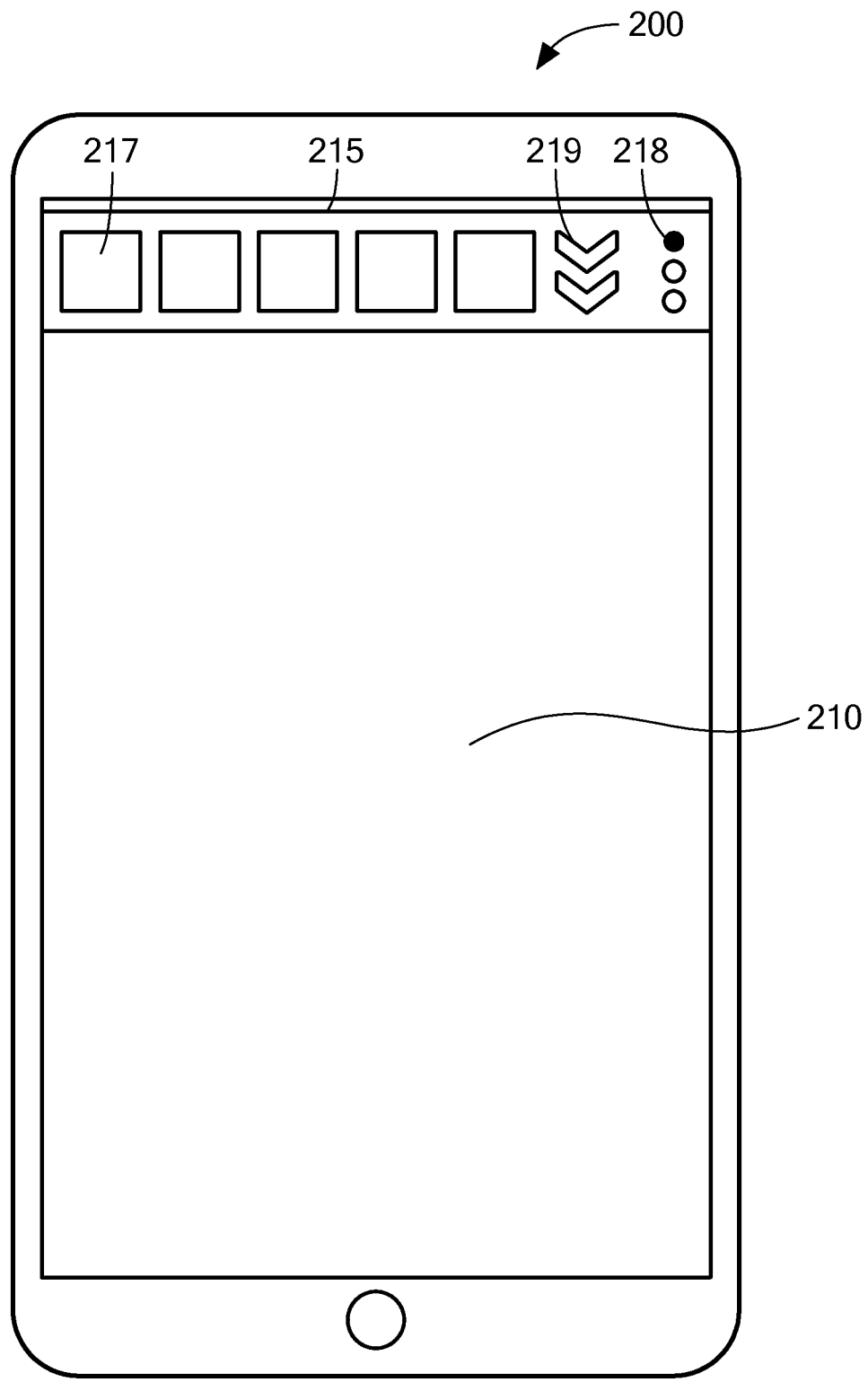
FIG. 2 shows a view of the display screen of a device for use in an embodiment of the present invention.

FIG. 1 shows a personal computer system 100 for use with embodiments of the invention. The system includes a display monitor 105 with a display screen 110. A computer processor is contained in a system unit 120. A keyboard 140 and a mouse 130 provide user input to the system 100. FIG. 2 shows a smartphone or tablet personal computer 200 for use with embodiments of the invention. The device 200 includes a touch screen 210 which provides for both information display and user input. These devices 100, 200 are shown by way of example and not by way of limitation. Other devices that can be used with embodiments of the invention include but are not limited to: phone-tablet-hybrids, handheld gaming systems and commercial television displays with pure gestural input using motion controllers. Embodiments of the invention may be implemented on any electronic display device with corresponding user input capabilities.

Figure 3:
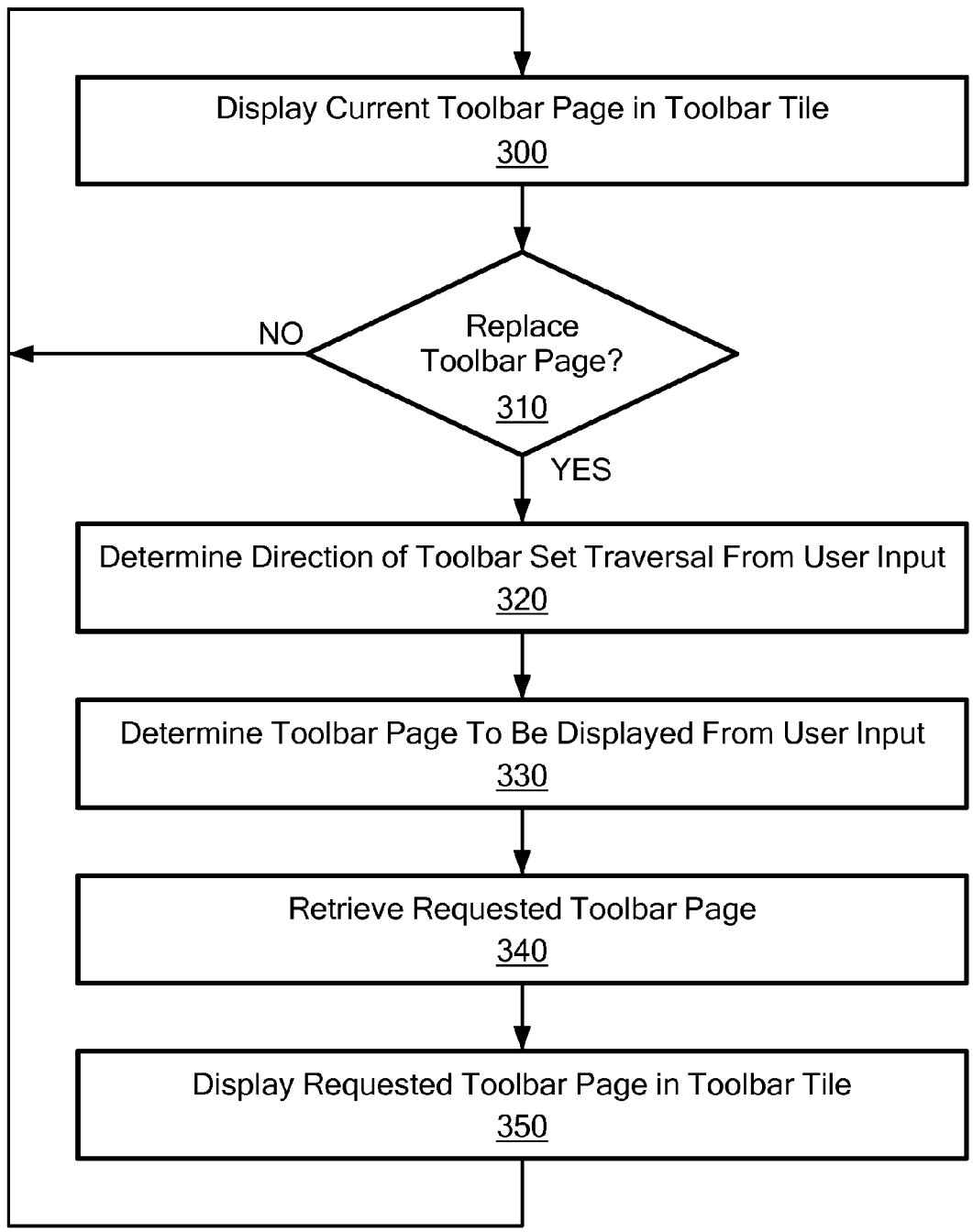
FIG. 3 is a flow diagram illustrating toolbar page replacement on the displays of the embodiments of FIGS. 1 and 2.

In a preferred embodiment of the invention, as shown in FIG. 2, a fixed area of the device touch screen 210, known as a tile 215, displays a toolbar page. The toolbar page in tile 215 contains five toolbar items 217, but a toolbar page may comprise any number of items that will fit in the tile 215. The toolbar items 217 in FIG. 2 are rectangular buttons, but toolbar items can take any shape. An ordered set of toolbar pages are provided that comprise two or more toolbar pages. Each page in the set of toolbar pages contains a fixed set of toolbar items. Each page of toolbar items from the ordered set is displayed on the touch screen in the tile 215 as a unit, one page at a time. The toolbar pages are displayed in the toolbar display tile 215 in order within the set. For purposes of explanation, displaying a toolbar page after the currently displayed toolbar page in the ordered set is called "moving forward" in the ordered set of toolbar pages, while displaying a previous page in the set is called "moving backward" in the set. As shown in FIG. 3, the currently displayed toolbar page 300 is replaced with another page from the ordered set of pages when requested by user input 310. The user input determines the direction of the requested page (forward, backward) within the ordered set of pages 320 and the distance in pages of the requested page from the currently displayed page. The requested toolbar page is identified 330, retrieved from the set of toolbar pages 340 and then displayed 350 in the toolbar display tile 215. The system then waits for further user input 300, 310.

The display screen 210 shows the position of the currently displayed toolbar page within the ordered set—in the embodiment of FIG. 2, toolbar position within the set is shown by a column of illuminated discs 218. In this example, the toolbar set contains three pages. Other position indicators may also be used such as a progress bar, etc. A progress bar is particularly useful when the set of toolbar pages contains many toolbar pages. The display screen 210 may also show the direction of navigation (i.e., forward or backward) of the toolbar replacement page within the ordered set of toolbar pages, as requested by the current user input gesture. In this case, the direction of toolbar page navigation is shown by dual downward pointing arrows 219. The dual downward pointing arrows indicate that the navigation of replacement pages is forward in the ordered set of toolbar pages, as described in the previous paragraph. Dual upward pointing arrows (not shown) would indicate the navigation of replacement toolbar pages is backward in the ordered set of toolbar pages. The arrows are removed when user input requesting replacement of toolbar pages is absent. Of course, icons other than arrows may be used to indicate direction of navigation (i.e., forward or backward) of the toolbar page replacement in the ordered set of toolbars.

Figure 4A:
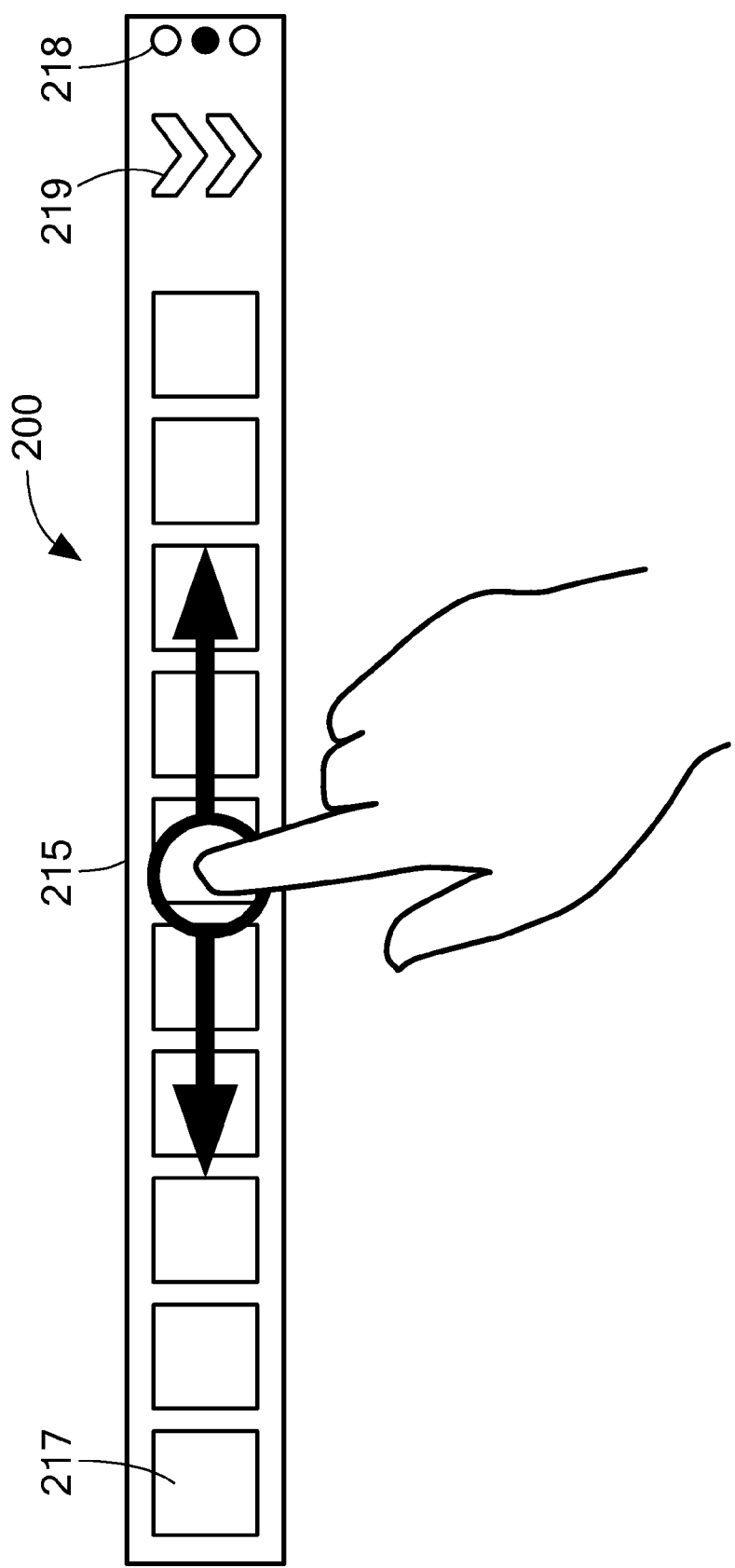
FIG. 4A illustrates user input gestures causing toolbar page navigation, used in conjunction with the display screen of FIG. 2.

User input 310, 320, 330 to request a toolbar page replacement may take a variety of forms in various embodiments of the invention. For example, FIG. 4A shows user gestures that may be employed with a touchscreen such as the screen 210 on the device 200 of FIG. 2. As illustrated in FIG. 4A, a user can navigate forward and backward through the toolbar pages using simple swipe gestures via finger touch. Once the gesture starts, moving a finger to the right on the toolbar tile 215 will page forward and moving the finger left on the toolbar tile will page backwards through the ordered set of toolbar pages. During this continuous swipe gesture, the user can request the desired toolbar page when the desired toolbar page is displayed in the toolbar tile. In various specific embodiments of the invention, this request can take the form of a "quick tap", i.e., the user quickly lifts his or her finger and taps back down in the same toolbar location. Alternatively, the user can request a toolbar page replacement by flicking his or her finger in a downward motion on the toolbar tile. Further, the user can quickly cancel the continuous swipe gesture by flicking his or her finger upward on the toolbar tile, which returns the toolbar tile to the initially displayed toolbar page view without replacing the toolbar page. These examples are presented by way of illustration and not by way of limitation: other user gestures for selecting a replacement toolbar page or canceling a replacement page may be used.

The toolbar items 217 underneath the user's finger can change with an animated transition to show toolbar page replacement. Various animated transitions can be used to display new pages of toolbar items during a user's input gesture. For example, as shown in FIGS. 4B through 4E, a "flip" of individual toolbar items may be used—as a user's finger moves across the toolbar tile in a continuous swipe gesture, individual toolbar items flip over in an animated fashion revealing the corresponding toolbar item in the replacement toolbar page. FIG. 4B illustrates the user beginning a swipe gesture to the right to move the toolbar tile from page two to page three of the ordered set of toolbar pages. As FIG. 4B shows, the first toolbar item of page two, 2A, is starting to flip over to the right. FIG. 4C shows the toolbar tile as the continuous swipe gesture progresses. The first two toolbar items (3A, 3B) from toolbar page three have flipped into view and the third toolbar item, 3C, is in mid-animation. The fourth item in toolbar page two, 2D, is starting the flipping animation. As FIG. 4D shows, the user is half way through the swipe gesture where the user is making a decision if toolbar page three is really what the user wants displayed, based on the partial display. There is no arrow on the user's hand because the continuous swipe gesture is paused. As shown in FIG. 4E, the user has decided that toolbar page three is not wanted, so the user's hand begins a continuous swipe gesture to the left. After the swipe gesture toward the left begins, the toolbar items on the right of the user's finger have changed to toolbar page one—which is the toolbar page the gesture requests—and the items to the left of the user's finger show the current toolbar page, i.e., page two. Thus, this animation works similar to flipping a deck of cards that has been fanned out. When the card on the end of the deck is lifted, the other cards progressively start to flip over. As the user drags his or her finger to the right on the toolbar tile, the next page of toolbar items to the currently displayed toolbar page, starts flipping into view to the left of the user's finger—like the cards flipped over in the fanned out card deck. During the gesture, the user may only see a percentage of the new toolbar items as they progressively flip over, but the animation gives the user the ability to see if the user is looking at the right page (or not) without displaying the entire toolbar page. If the replacement toolbar is not the toolbar the user wants, the user can move the user's finger in the other direction (left) and the page of toolbar items previous to the currently displayed page will start progressively flipping in from the right. Other animations can be used such as a horizontal slide where all toolbar items in the replacement page slide in from the left or right depending on the direction of the swipe gesture.

In another preferred embodiment of the invention, a different animation of toolbar items 500 is used to show toolbar page replacement, as shown in FIGS. 5A and 5B. This toolbar display tile 515 includes a progress bar 518 to show the currently displayed toolbar page in an "N" page ordered toolbar page set. As the user moves his or her finger across the toolbar tile to the right, the currently displayed toolbar page items 517 start to compact together to the right. If the user is swiping his or her finger to the right, the next set of toolbar items snap in from the left and additional toolbar items are displayed as space allows. When the current set of toolbar items reaches a given number, the toolbar items of the currently displayed toolbar page disappear and the complete successive page in the ordered set of toolbar items is displayed in the toolbar display tile 515, snapping into place. As the continuous swipe gesture continues to the right, this paging/animation cycle continues. If the user starts moving his or her finger in the opposite direction, this toolbar page replacement animation process takes place in the reverse direction (i.e., backward) in the ordered set of toolbar pages.

Note that these user gestures and animations are described for purposes of illustration, not for purposes of limiting the gestures and animations that may be used in various embodiments of the invention.

Figure 6:
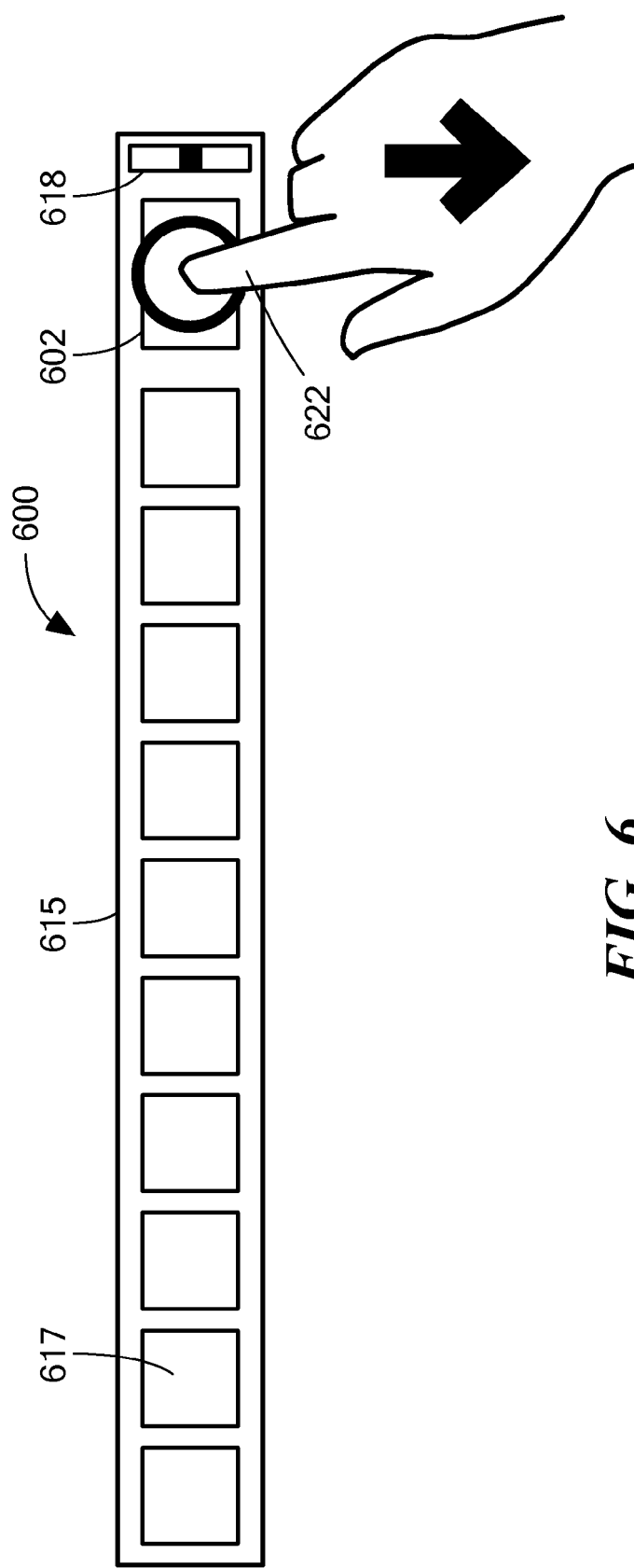
FIG. 6 illustrates a toolbar display tile with a virtual touchpad used for toolbar page navigation in an embodiment of the present invention.

In another embodiment of the invention, a toolbar tile 615 with a virtual touch pad for page navigation is provided 600 on the display screen 210 of FIG. 2, as shown in FIG. 6. A user can use a virtual touch pad 602 on the display screen 210, placed to the side of the toolbar display tile 615 to navigate through toolbar pages in the ordered set without obscuring toolbar items 617, as can happen during a swipe gesture. Page navigation is accomplished in a single continuous gesture on the virtual touch pad 602 by moving the user's finger 622. The system recognizes very small movements of the user's finger from side-to-side or up-and-down on the virtual touch pad 602. These finger movements cause the toolbar tile 615 to preview each successive toolbar page, cycling forward or backward in the ordered set of toolbar pages, depending on the direction of the user's finger movement. For example, moving the user's finger upward on the touchpad can cause backward movement within the ordered set of pages, while a downward finger movement can cause movement forward within the ordered set of pages. The system may adjust paging and toolbar item animation speeds based on the speed of the user's finger movement. During the virtual touchpad gesture, the user can request the desired toolbar by quickly lifting his or her finger and tapping back down on the touchpad via the quick tap gesture. Of course, other user gestures may accomplish a similar result: for example, in other embodiments, a side-to-side finger movement may cause page navigation in a fashion similar to the upward-and-downward finger movement. A progress bar 618 first shows the position of the toolbar page currently displayed in the ordered set of pages and then shows the position of the toolbar page preview as the user navigates through the set of toolbar pages via the touchpad 602.

Figure 7:
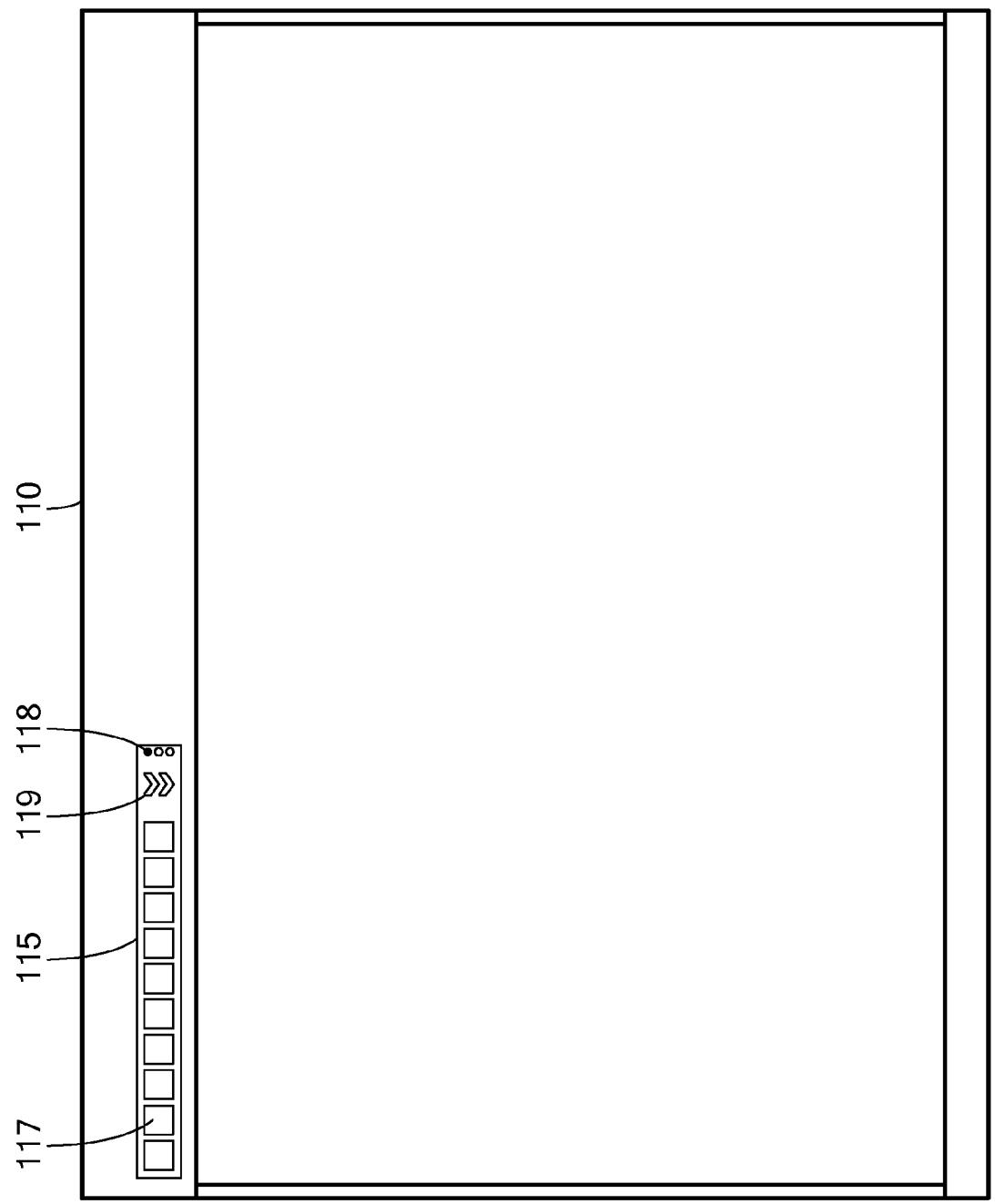
FIG. 7 illustrates the layout of elements of the user interface employed with the computer system of FIG. 1, in an embodiment of the invention.

FIG. 7 shows a display screen layout for the display screen 110 in the computer system 100 of FIG. 1, in an embodiment of the invention. The display screen 110 includes a toolbar tile 117, a number of toolbar items 115, a toolbar page position indicator 118 and a toolbar direction of motion indicator 119. Each feature performs the function that the corresponding feature shown in FIG. 2 plays. In this embodiment, user input is provided by the mouse 130 and/or keyboard 140. For example, the input gesture to replace a toolbar page may be a combination of holding a key, such as CTRL, then moving the mouse from left to right or right to left over the toolbar tile to provide the function of the "swipe" gesture. Other combinations of keys and mouse movement may be used based on the system configuration. Animated transitions of toolbar items may be employed in this embodiment of the invention as described in connection with the embodiment of FIG. 2.

In some embodiments of the invention, the system determines the number of toolbar items presented on each toolbar page in the ordered set of toolbar pages based on the size of the display area devoted to the toolbar tile in the particular implementation. For example, a page of related toolbar items, numbering "N" items, may be presented in the toolbar tile 115 on a display screen such as the screen 110 of FIG. 1. The system could automatically divide the toolbar page into N times two pages for a tablet device and N times four pages for a smart-phone device, for example, in recognition of the smaller toolbar tile area available on these devices compared to the toolbar tile of a display monitor. This automatic adaptation of the number of toolbar items per toolbar page based on the toolbar tile size advantageously reduces the effort required to port an implementation from one display screen type to another display screen type.

In another embodiment of the invention, the system orders the toolbar items within a toolbar page so that toolbar items are presented in the order of frequency of use. For example, the system may present toolbar items in a page so that the most frequently used toolbar item is presented in the left-most toolbar item position in the toolbar tile, the second most frequently used item is presented to the immediate right of the first toolbar item, and so forth, for the remaining items in the toolbar page. In various specific embodiments of the invention, toolbar items may be grouped into pages by toolbar item category with similar toolbar items grouped together. In other specific embodiments, within these toolbar item categories, the order of presentation of items in a toolbar page in the toolbar display tile can be set according to frequency of toolbar item use: toolbar items are presented from one end of the toolbar tile to the other end in order of decreasing frequency of use. In further embodiments, the system can collect information on a particular user's frequency of use for each toolbar item and use this information to determine the order of presentation of toolbar items within a displayed toolbar page for that user.

Figure 8A:
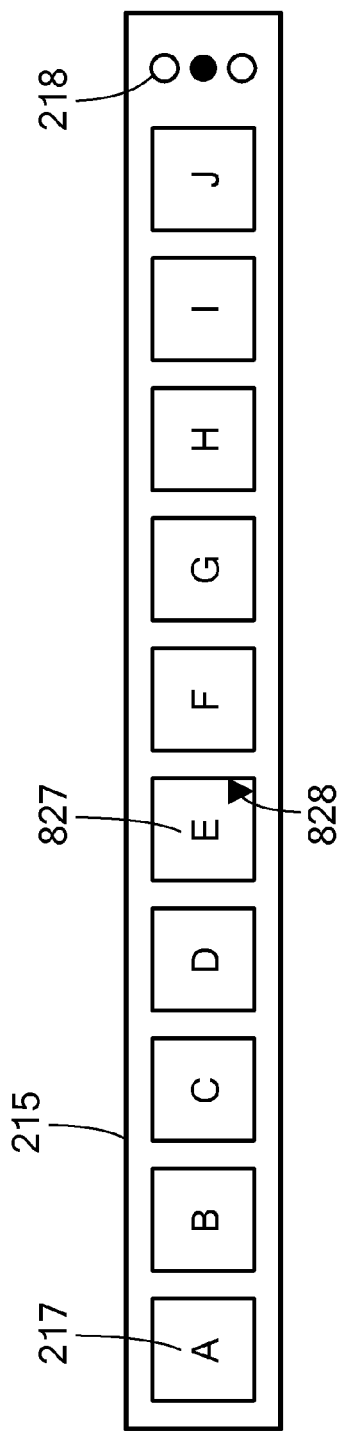
Figure 8B:
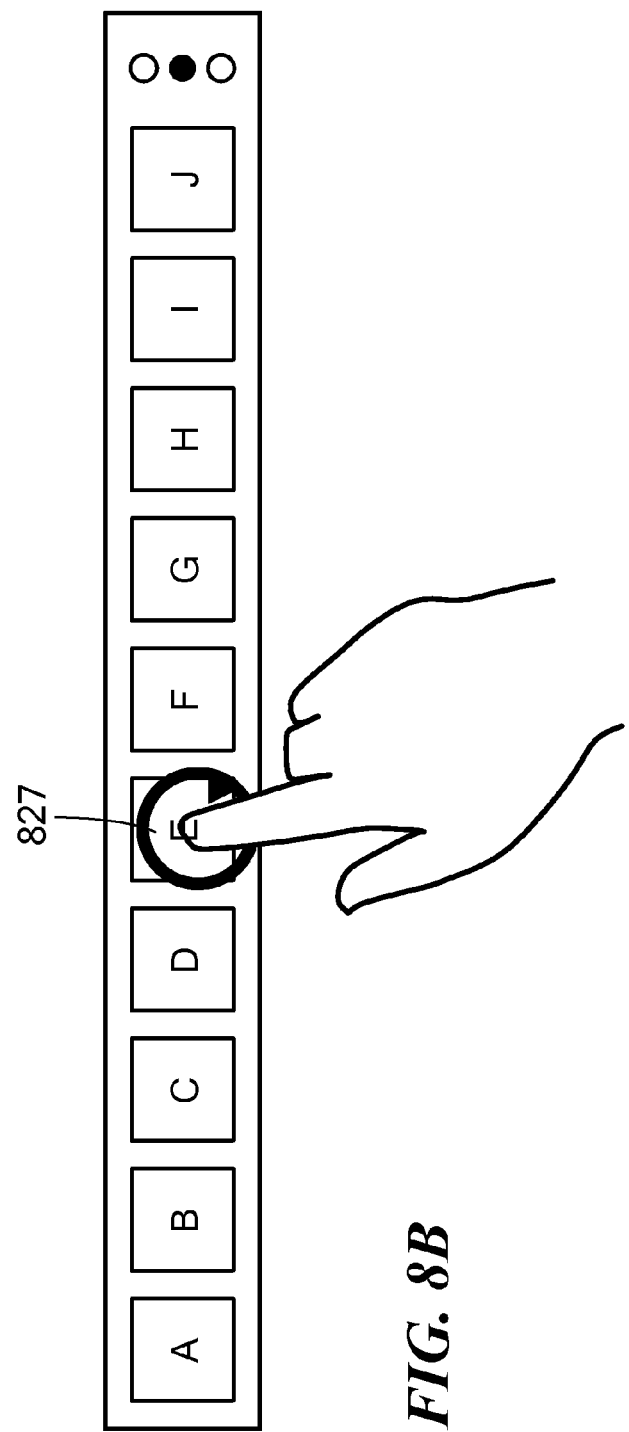
Figure 8E:
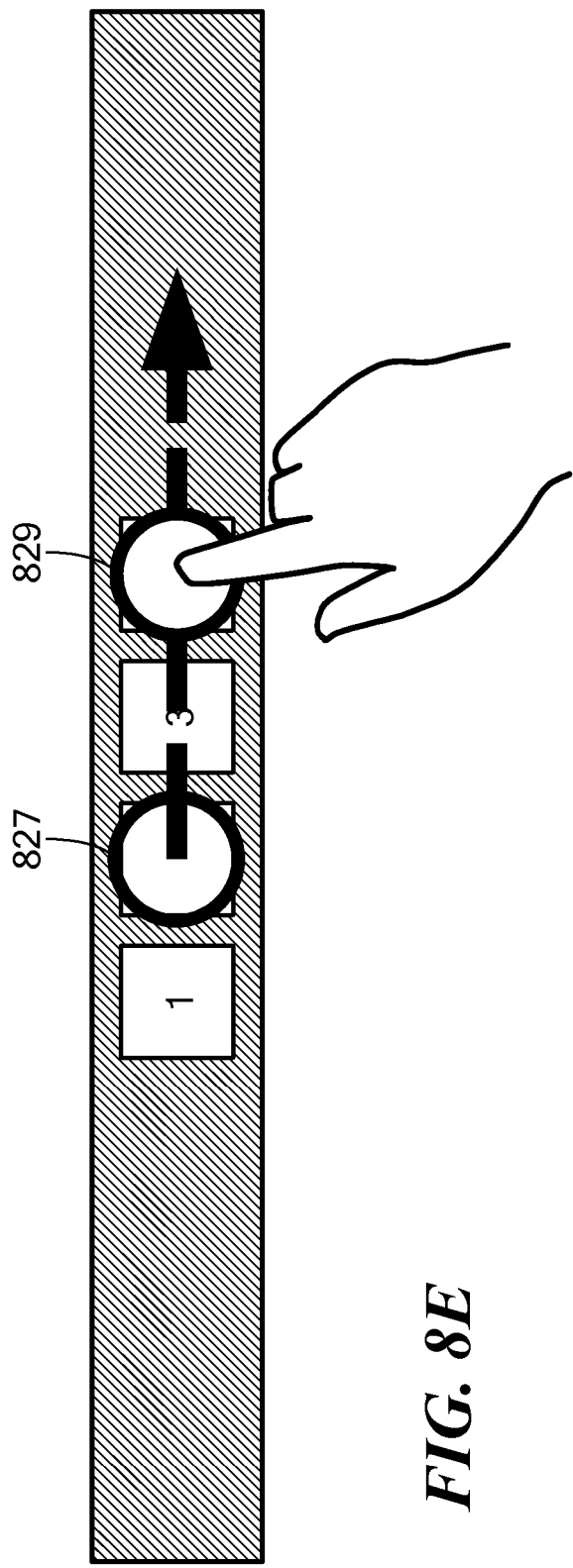
Figure 8F:
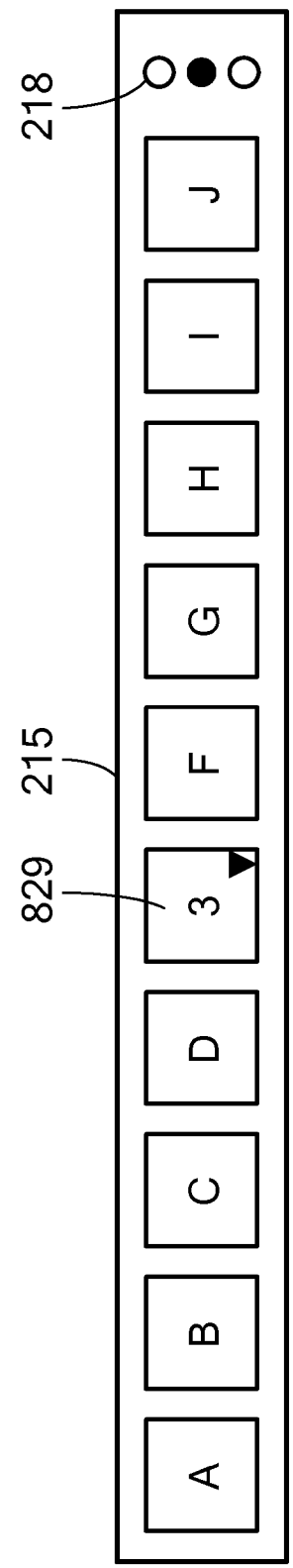
Figure 9:
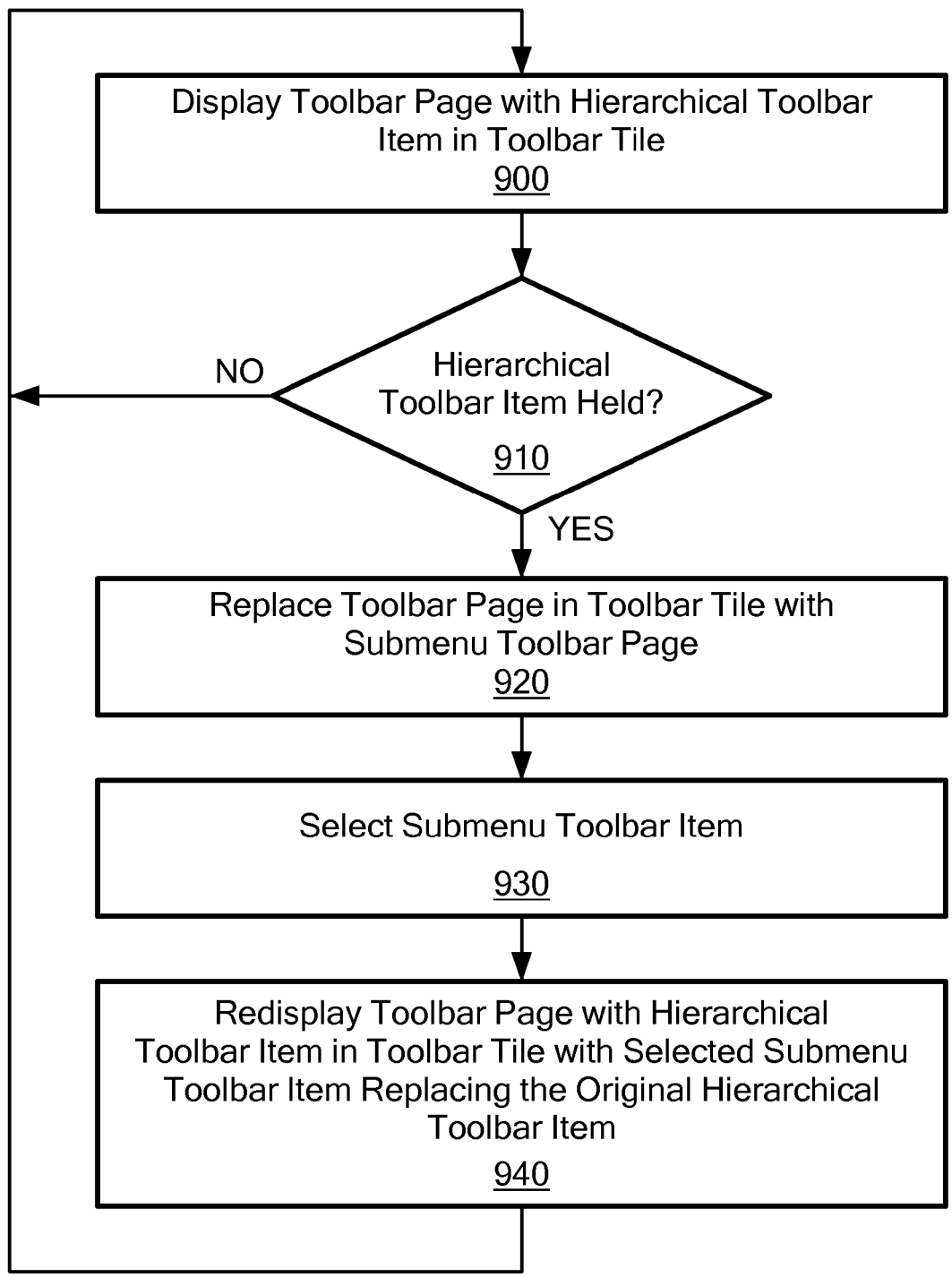

In another preferred embodiment of the invention, access to hierarchical submenus is provided via a user gesture, as shown in FIGS. 8A-F and FIG. 9. FIG. 8A shows a toolbar page 215 with a hierarchical toolbar item 827 indicated by a visual indicator 828, 900. In FIG. 8A, for example, the indicator is an arrow glyph 828 on the toolbar button labeled "E" 827. To access additional items in the hierarchy, the user can tap and hold the hierarchical toolbar item 827 with the user's finger or click and hold a mouse button while pointing at the toolbar item 910, as shown in FIG. 8B. The system replaces the existing toolbar page with a submenu toolbar page 830, 920, as shown in FIG. 8C. In some embodiments, the toolbar background is also changed to indicate that the replacement toolbar is a submenu from the previous toolbar page. For example, the background of the submenu toolbar 830 may change to a different color from the toolbar it replaces, etc. In FIG. 8C, the hierarchical toolbar item 827, labeled "E", is shown with the other items of that submenu ("1", "2" and "3") surrounding it in the replacement submenu toolbar 830. The toolbar 830 background is greyed to indicate that this toolbar page is a submenu. As shown in FIG. 8D, the user can lift the user's finger or release the mouse button to view the toolbar items in the submenu. The user can then tap the desired toolbar item 217 with the user's finger or activate the item 930 with a mouse click. Alternatively, as shown in FIG. 8E, the user may keep his or her finger on the button 827 or the mouse button depressed and move to the desired button 829 in a continuous gesture. The item 829 under the user's finger or mouse pointer will be selected when the user lifts the user's finger or the mouse button is released. After the submenu item selection occurs, the original toolbar page 215 reappears 940 with the selected item from the submenu replacing the hierarchical toolbar item 827. As shown in FIG. 8E, the toolbar item "E" 827 has been replaced with the button, labeled "3" 829.

Various aspects of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. For example, while the toolbar tiles have been shown in the figures oriented horizontally on display screens, toolbar tiles with other orientations, such as oriented vertically on the screen, may be employed in various embodiments of the invention, with the user gestures modified accordingly. Further, description of directions as "left," "right," "upward," "downward," etc. are for illustration only and are not meant to limit the scope of the invention. All such variations and modifications are intended to be within the scope of the present invention as defined in any appended claims.

What is claimed is:

1. A method for displaying toolbar pages in a toolbar tile on an electronic display screen comprising:
   a. providing an ordered set of toolbar pages, each toolbar page comprising at least one display item;
   b. displaying a given toolbar page from the ordered set in the toolbar tile and displaying an indicator of the position within the ordered set of the currently displayed page;
   c. receiving a user input requesting replacement of the currently displayed toolbar page with a requested page, the user input indicating a direction for the requested page from the currently displayed page in the ordered set;
   d. replacing the given toolbar page with a second toolbar page from the ordered set, the replacement toolbar page determined by the user input; and
   e. updating the indicator of the position within the ordered set of the currently displayed toolbar page.

2. The method as in claim 1, wherein the user input requesting toolbar replacement identifies the distance in pages of the requested toolbar from the currently displayed toolbar.

3. The method as in claim 1, wherein the user input requesting toolbar replacement includes swiping the toolbar tile with the user's finger.

4. The method as in claim 1, wherein the user input requesting toolbar replacement includes moving a pointing device pointer across the toolbar tile.

5. The method as in claim 1, wherein the toolbar items are animated when the toolbar page is replaced.

6. The method as in claim 5, wherein the toolbar animation includes flipping over a given toolbar item when the toolbar page is replaced.

7. The method as in claim 5, wherein the toolbar animation includes sliding in replacement toolbar items from the side of the toolbar when the toolbar page is replaced.

8. The method as in claim 1, wherein the indicator of the position of the currently displayed page within the ordered set is a column of illuminated discs.

9. The method as in claim 1, wherein the indicator of the position of the currently displayed page within the ordered set is a progress bar.

10. A method for displaying a hierarchical toolbar page in a toolbar tile on an electronic screen comprising:
   a. displaying a given toolbar page, the toolbar page including a first hierarchical toolbar item;
   b. receiving a user input requesting display of a submenu page, the submenu page associated with the first hierarchical toolbar item;
   c. replacing the given toolbar page in the toolbar tile with the submenu page;
   d. receiving a user input selecting a second hierarchical toolbar item from the submenu page; and
   e. redisplaying the given toolbar page in the toolbar tile with the second hierarchical toolbar item replacing the first hierarchical toolbar item.

11. The method of claim 10, wherein the first hierarchical toolbar item includes a hierarchical indicator.

12. The method of claim 11, where the hierarchical indicator is an arrow glyph.

13. A system for displaying toolbar pages in a toolbar tile on an electronic display comprising a processor, a memory, and the electronic display, the memory containing instructions that cause the processor to:
   a. display a given toolbar page from an ordered set of toolbar pages in the toolbar tile, each toolbar page comprising at least one display item, and display an indicator of the position within the ordered set of the currently displayed page;
   b. receive a user input requesting replacement of the currently displayed toolbar page with a requested page, the user input indicating a direction for the requested page from the currently displayed page in the ordered set;
   c. replace the given toolbar page with a second toolbar page from the ordered set, the replacement toolbar page determined by the user input; and
   d. update the indicator of the position within the ordered set of the currently displayed toolbar page.

14. The system as in claim 13, wherein the user input requesting toolbar replacement identifies the distance in pages of the requested toolbar from the currently displayed toolbar.

15. The system as in claim 13, wherein the user input requesting toolbar replacement includes swiping the toolbar tile with the user's finger.

16. The system as in claim 13, wherein the user input requesting toolbar replacement includes moving a pointing device pointer across the toolbar tile.

17. The system as in claim 13, wherein the toolbar items are animated when the toolbar page is replaced.

18. A system for displaying toolbar pages in a toolbar tile on an electronic display comprising a processor, a memory, and the electronic display, the memory containing instructions that cause the processor to:
   a. display a given toolbar page, the toolbar page including a first hierarchical toolbar item;
   b. receive a user input requesting display of a submenu page, the submenu page associated with the first hierarchical toolbar item;
   c. replace the given toolbar page in the toolbar tile with the submenu page;
   d. receive a user input selecting a second hierarchical toolbar item from the submenu page; and
   e. redisplay the given toolbar page in the toolbar tile with the second hierarchical toolbar item replacing the first hierarchical toolbar item.

19. The system as in claim 18, wherein the first hierarchical toolbar item includes a hierarchical indicator.

20. The system as in claim 18, where the hierarchical indicator is an arrow glyph.

21. The method of claim 10, wherein:
   receiving a user input requesting display of a submenu page comprises receiving a tap and hold of the first hierarchical toolbar item from a touch screen; and
   receiving a user input selecting a second hierarchical toolbar item from the submenu page comprises tapping or dragging the second hierarchical toolbar item from the submenu page via the touch screen.

22. The method of claim 10, wherein:
receiving a user input requesting display of a submenu page comprises receiving a mouse click on the first hierarchical toolbar item; and
receiving a user input selecting a second hierarchical toolbar item from the submenu page comprises receiving a mouse click on the second hierarchical toolbar item from the submenu page.

\* \* \* \* \*